US011556659B1

(12) United States Patent
Kumar et al.

(10) Patent No.: US 11,556,659 B1
(45) Date of Patent: Jan. 17, 2023

(54) PARTIALLY ENCRYPTED SNAPSHOTS

(71) Applicant: Amazon Technologies, Inc., Seattle, WA (US)

(72) Inventors: Sandeep Kumar, Sammamish, WA (US); Daniel Rabinovich, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 136 days.

(21) Appl. No.: 17/249,514

(22) Filed: Mar. 3, 2021

(51) Int. Cl.
*G06F 21/60* (2013.01)
*G06F 16/11* (2019.01)

(52) U.S. Cl.
CPC .......... *G06F 21/602* (2013.01); *G06F 16/128* (2019.01)

(58) Field of Classification Search
CPC .............................. G06F 21/602; G06F 16/128
See application file for complete search history.

(56) References Cited

U.S. PATENT DOCUMENTS

| | | | |
|---|---|---|---|
| 8,166,314 B1 | 4/2012 | Raizen et al. | |
| 8,261,068 B1 | 9/2012 | Raizen et al. | |
| 8,375,437 B2 | 2/2013 | Linsley et al. | |
| 8,687,814 B2 | 4/2014 | Nord et al. | |
| 9,892,265 B1 | 2/2018 | Tripathy et al. | |
| 10,728,025 B2 | 7/2020 | Kumar et al. | |
| 10,867,052 B1 | 12/2020 | Kumar et al. | |
| 2011/0276806 A1 | 11/2011 | Casper et al. | |
| 2012/0297206 A1 | 11/2012 | Nord et al. | |
| 2014/0068279 A1 | 3/2014 | Kurspahic et al. | |
| 2014/0229729 A1 | 8/2014 | Roth et al. | |
| 2017/0142076 A1 | 5/2017 | Ford et al. | |
| 2018/0295105 A1 | 10/2018 | Feng | |
| 2019/0319785 A1* | 10/2019 | Kumar | H04L 9/14 |

(Continued)

FOREIGN PATENT DOCUMENTS

WO    WO 2019/199543 A1    10/2019

OTHER PUBLICATIONS

Anonymous, AWS Key Management Service Concepts, Dec. 16, 2017, Retrieved from the Internet: URL:https://web.archive.org/web/20171216063915/http://docs.aws.amazon.com/kms/latest/developergide/concepts.html#encrypt context; 5 pages.

(Continued)

*Primary Examiner* — Philip J Chea
*Assistant Examiner* — Sangseok Park
(74) *Attorney, Agent, or Firm* — Knobbe, Martens, Olson & Bear, LLP

(57) ABSTRACT

Generally described, one or more aspects of the present application correspond to techniques for managing snapshots in a partially encrypted state and providing access to partially encrypted snapshots. These snapshot management techniques allow a snapshot that is being encrypted to be accessed prior to the encryption being completed. Such a snapshot may have some blocks that have been encrypted, and other blocks that have not yet been encrypted. In order to provide access to such a snapshot in a partially encrypted state, a system may allow the encryption status of the blocks in the snapshot to be checked at the block level instead of at the snapshot level (or at some other intermediary level therebetween), according to some embodiments. By doing so, the system can reduce the delays resulting from snapshots that are locked during the encryption process.

20 Claims, 9 Drawing Sheets

(56) References Cited

U.S. PATENT DOCUMENTS

2020/0322138 A1   10/2020  Kumar et al.
2021/0234673 A1*  7/2021  Kurian ................... H04L 9/085

OTHER PUBLICATIONS

International Preliminary Report on Patentability for PCT Application No. PCT/US2019/025590 dated Oct. 13, 2020.
International Search Report for PCT Application No. PCT/US2019/025590 dated Jul. 15, 2019.

* cited by examiner

PARTIALLY ENCRYPTED SNAPSHOTS

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, set up with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively static infrastructure of on-premises computing environments, requires a system architecture that can reliably re-allocate its hardware according to the changing needs of its user base.

DETAILED DESCRIPTION

Introduction

Figure 1:
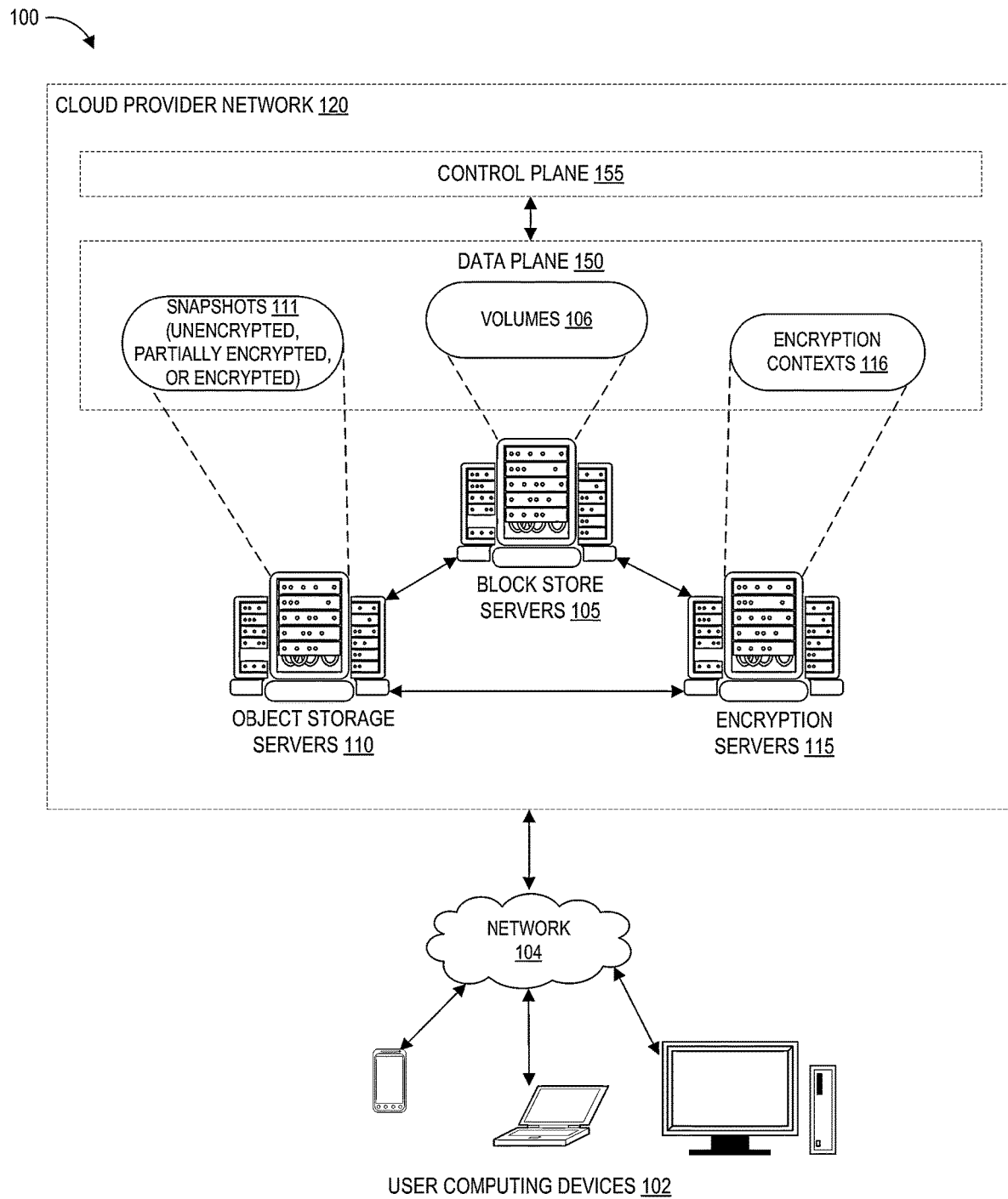
FIG. 1 depicts a schematic diagram of a cloud provider network in which various embodiments according to the present disclosure can be implemented.

Generally described, the present disclosure relates to managing snapshots in a partially encrypted state and providing access to such partially encrypted snapshots. Typically, volumes of data (referred to herein as "volumes") and point-in-time backup copies of such volumes (referred to herein as "snapshots") may exist in (i) an encrypted state in which the data blocks included therein are encrypted, or (ii) an unencrypted state in which the data blocks included therein are unencrypted. The encryption status of such volumes and snapshots may be indicated using an encryption status flag. For example, when accessing a snapshot and the data blocks included therein, the encryption status flag of the snapshot may be checked, and the data blocks in the snapshot may be treated as encrypted data blocks or unencrypted data blocks.

In some cases, an unencrypted snapshot may be converted to an encrypted state (e.g., to improve security). In such cases, while the data blocks of the snapshot are being encrypted, the snapshot may be locked and any access to the data blocks in the snapshot may be prevented, because the snapshot is neither unencrypted nor encrypted during that time and thus the encryption status of a given data block cannot be ascertained. However, this causes delays in computing operations that rely on the data blocks in the snapshot such as hydration (e.g., process of importing the data blocks stored in a high durability data store onto a low latency data store accessible by users of the volumes), replication, or migration of volumes.

The aforementioned problems, among others, are addressed in some embodiments by the disclosed techniques for managing snapshots in a partially encrypted state and providing access to such partially encrypted snapshots. The disclosed technology beneficially provides a mechanism for enabling access to a snapshot whose data blocks are being converted from an unencrypted state to an encrypted state (or vice versa). For example, the disclosed techniques can involve a snapshot-level encryption status indicator or flag that indicates the encryption status of the snapshot, as well as a lower-level encryption status indicator or flag (e.g., data-block-level) that indicates the encryption status of the data blocks within the snapshot, allowing the system to easily determine whether a data block within a snapshot is encrypted or unencrypted despite the snapshot being neither fully encrypted nor fully unencrypted and thus the snapshot-level encryption status indicator or flag not being able to be used to determine the encryption status of the data block.

The snapshot management techniques according to embodiments of the present disclosure allow the data blocks within a snapshot to be accessed while the snapshot is in the middle of being encrypted. A snapshot in such a state may include some data blocks that have finished being encrypted, and other data blocks that have not yet been encrypted. In order to provide access to the snapshot in such a partially encrypted state, a system may allow the encryption status of the data blocks within the snapshot to be checked at the block level instead of at the snapshot level (or at some other intermediary level therebetween), according to some embodiments. By doing so, the system avoids having to lock the snapshot while the snapshot is being encrypted and can thus eliminate or reduce the delays that would have resulted from locking the snapshot during its encryption process.

As would be appreciated by one of skill in the art, the use of a "partially encrypted" state and multi-tier encryption status indication system, as disclosed herein, represents a significant technological advance over prior implementations. Specifically, the use of the multi-tier encryption status indication system allows snapshots to be encrypted without experiencing additional delays or increased latency associated with locking and preventing access to the snapshots while the encryption is in progress. As such, the embodiments described herein represent significant improvements in computer-related technology.

Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting.

Overview of Example Computing Environment for Managing Partially Encrypted Snapshots FIG. 1 depicts an example computing environment 100 including a cloud provider network 120 in which the disclosed partially encrypted snapshots can be implemented. The cloud provider network 120 can be accessed by user computing devices 102 over a network 104. The cloud provider network 120 includes one or more encryption servers 115, one or more object storage servers 110, and one or more block store servers 105 that are in networked communication with one another and with the network 104 to provide users with on-demand access to computing resources including volumes 106 and snapshots 111, among others. These particular resources are described in further detail below. Some implementations of cloud provider network 120 can additionally include elastic compute servers providing computing resources (referred to as "instances"), domain name services ("DNS") servers, relational database servers, and other server configurations (not illustrated) for supporting on-demand cloud computing platforms. Each server includes hardware computer memory and/or processors, an operating system that provides executable program instructions for the general administration and operation of that server, and a computer-readable medium storing instructions that, when executed by a processor of the server, allow the server to perform its intended functions.

The cloud provider network 120 can provide on-demand, scalable computing platforms to users through the network 104, for example allowing users to have at their disposal scalable "virtual computing devices" via their use of the object storage servers 110 and block store servers 105. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

Turning specifically to the roles of the different servers within the cloud provider network 120, the block store servers 105 provide persistent data storage in the form of volumes 106. In FIG. 1, these are shown as encrypted volumes 106 that can be encrypted from unencrypted snapshots as described herein. Some of the volumes stored on the block store servers 105 may be encrypted through other techniques, or may be unencrypted. The block store servers 105 include one or more servers on which data is stored in as blocks. A block is a sequence of bytes or bits, usually containing some whole number of records, having a maximum length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context. In other embodiments, each block may be associated with metadata providing additional information and/or properties regarding the block.

User volumes 106, which can be treated as an individual hard drive ranging for example from 1 GB to 1 terabyte TB in size, are made of one or more blocks stored on the block store servers 105. Although treated as an individual hard drive, it will be appreciated that the hardware storing a volume may not actually be a hard drive, but instead may be one or more virtualized devices implemented on one or more underlying physical host devices. Volumes 106 may be partitioned a number of times (e.g., up to 16) with each partition hosted by a device of the cloud provider network 120 that has the ability to transfer data at around 1 GB per second ("Gbps") in some implementations. The block store servers 105 can have built-in redundancy for volumes by replicating the volume across multiple servers within an availability zone (e.g., a primary replica and a synchronous secondary replica), which means that volumes will not fail if an individual drive fails or some other single failure occurs. The block store servers 105 can support user reads and writes (input/output operations, or "I/O operations"), and can be accessible to the user computing devices 102 over the network 104.

The object storage servers 110 represent another type of storage within the cloud provider network 120. The object storage servers 110 and associated control plane functionality can provide an object-based storage service of the cloud provider network. Object-based storage services can be referred to as a blob storage service, cloud object storage service, or cloud storage service, in various implementations. The object storage servers 110 include one or more servers on which data is stored as objects within resources referred to as buckets. Each object typically includes the data being stored, a variable amount of metadata that enables various capabilities for the object storage servers 110 with respect to analyzing a stored object, and a globally unique identifier or key that can be used to retrieve the object. Objects stored on the object storage servers 110 are associated with a unique identifier, such that authorized access to them can be obtained through requests from networked computing devices in any location. Each bucket is associated with a given user account. Users can store as many objects as desired within their buckets, can write, read, and delete objects in their buckets, and can control access to their buckets and the contained objects. Further, in embodiments having a number of different object storage servers 110 distributed across different ones of the regions described above, users can choose the region (or regions) where a bucket is stored, for example to optimize for latency. Users can use object storage servers 110 for purposes such as storing photos on social media websites, songs on music streaming websites, or files in online collaboration services, to name a few examples. Applications developed in the cloud often take advantage of the vast scalability and metadata characteristics of the object storage servers 110. The object storage servers 110 can support highly parallel data accesses and transfers.

The object storage servers 110 can offer even greater redundancy than the block store servers 105, as the object storage servers 110 can automatically replicate data into multiple availability zones. The object storage servers 110 also have different data throughput than the block store servers 105, for example around 20 Mbps for a single stream of data. While the object storage servers 110 can be used independently from the volumes described above, they can also be used to provide data backup as described below with respect to snapshots (e.g., object-stored backups of volume data).

Users can instruct the cloud provider network 120 to create snapshots of their volumes stored on the block store servers 105. When a volume is unencrypted, typically any snapshot of that volume would be unencrypted as well. A snapshot can then be used to create a new volume with information matching the volume captured in the snapshot, for example providing the benefit of feeding the volume data to the new copy without impacting I/O operations at the primary and secondary replicas of the volume. Further, due to the greater redundancy of the object storage servers 110 provided in some embodiments, such snapshots may provide a more resilient backup copy of a volume than additional copies stored on the block store servers 105. Another benefit of using a snapshot to create a new volume copy is that it may provide the ability to replicate the volume across availability zones, while the block store servers 105 may only support replication within a given availability zone.

In one embodiment, a snapshot is a point-in-time block-level backup of the volume, stored as a copy of data on the volume on one or more of the object storage servers 110 (e.g., as a single object or a collection of objects). However, unlike other data stored on the object storage servers 110, snapshots may not be accessible within user buckets, and instead are accessible through the application programming interface ("API") of the block store servers 105. In one example, snapshots are implemented as incremental records of data within a volume. Illustratively, when the first snapshot of a volume is taken, all blocks of the volume that contain valid data are copied as one or more objects to the object storage servers 110, and then a snapshot "table of contents" or "manifest" file is written to the object storage servers 110 that includes a record of the one or more objects, as well as the data blocks of the volume to which each of the one or more objects correspond. Due to the use of incremental snapshots, when the subsequent snapshots are taken of the same volume, only the blocks that have changed since the first snapshot are copied to the object storage servers 110, and the table of contents or manifest file can be updated to point to the latest versions of each data block (or a second table of contents or manifest file can be created, enabling the initial table of contents or manifest file to remain as a record of a prior version of the volume). An initial snapshot can be used to reconstruct the volume at the time of the initial snapshot, or snapshots from subsequent time points can be combined together or with the initial snapshot to reconstruct the entire volume at any individual subsequent point in time. In this way, snapshots can serve as both incremental backups and a full backup of a given volume. Subsequent snapshots may be referred to as child snapshots, and preceding snapshots may be referred to as parent snapshots. A child snapshot along with all the parent snapshots on which the child snapshot depends may be collectively referred to as the child snapshot's snapshot lineage.

When creating a snapshot, any data written to the volume up to the time the snapshot is started can be included in the snapshot, and users can continue to perform I/O operations to their volumes during snapshot creation without affecting the snapshot. Users can create a new volume from a snapshot, for example to create duplicates of their volumes or to restore data. The new volume will contain all the data stored in the snapshot and thus will be a duplicate of the original volume at the time the snapshot was started. In this manner, snapshots can also be used to transfer a volume's data from one availability zone to another. Similarly, snapshots can be taken of computing resource instances to create a "machine image" of that instance stored in the object storage servers 110, and new copies of the instance can be launched from the machine image.

The encryption servers 115 can be in data communication with the object storage servers 110 and the block store servers 105 to facilitate encryption and decryption of the volumes 106 and the snapshots 111. In some embodiments, the volumes 106 or the snapshots 111 are copied over to the encryption servers 115 and encrypted or decrypted on the encryption servers 115. In other embodiments, the volumes 106 or the snapshots 111 are encrypted or decrypted "in place" without being copied over to the encryption servers 115.

In addition, the encryption servers 115 store encryption contexts 116 for encrypting the volumes 106 and the snapshots 111. Encryption context can refer to a set of key-value pairs used for encryption and decryption operations within the cloud provider network 120, and can also include a grant token on the encryption key and/or an encryption status flag, which in the disclosed techniques would initially be set to "partially encrypted" and subsequently set to "encrypted." Generally, encryption context refers to any value (e.g., a string of alphanumeric characters) that can be used to encrypt data. Although the encryption context is not included in the encoded volume, it is cryptographically bound to the encoded volume during encryption and is passed again when a user or the system calls for decryption or re-encryption. Decryption may only succeed if the encryption context passed for decryption is exactly the same as the encryption context used during encryption. In some implementations, the encryption servers 115 can be in data communication with the object storage servers 110 and the block store servers 105, but may not be accessible to the user computing devices 102.

Additional details relating to the techniques for encrypting and decrypting data blocks within a volume or snapshot are provided in U.S. application Ser. No. 15/952,743 (U.S. Pat. No. 10,728,025), titled "ENCRYPTION BY DEFAULT IN AN ELASTIC COMPUTING SYSTEM," which is incorporated herein by reference in its entirety.

FIG. 1 also depicts a data plane 150 and a control plane 155 of the cloud provider network 120. The data plane 150 represents the movement of user data through the cloud provider network 120, while the control plane 155 represents the movement of control signals through the cloud provider network 120. One skilled in the art will appreciate that the data plane 150 and control plane 155 represent logical constructs related to the operation of servers 105, rather than a physical configuration of the servers 105, 110, 115.

The control plane 155 is a logical construct that can be implemented by at least one server with computer-executable software for coordinating system and user requests and propagating them to the appropriate servers in the cloud provider network 120. Functions of the control plane 155 can include, for example, replication of data, failover operations, and receiving requests from users for specific actions to be performed with respect to the data plane 150. These can include creating, cloning, and snapshotting volumes 106, as well as setting and updating the encryption status of such volumes, snapshots, and any data blocks included therein. The data plane 150 in the illustrated embodiment is implemented by execution of operations on the volumes 106, snapshots 111, and encryption contexts 116 as shown in FIG. 1.

Although the block store servers 105, the object storage servers 110, and the encryption servers 115 are shown as separate components in the example of FIG. 1, in other embodiments, one or more of these components may be combined. For example, the encryption servers 115 may be integrated into the block store servers 105 and/or the object storage servers 110, and the block store servers 105 and/or the object storage servers 110 may perform the operations described herein as being performed by the encryption servers 115.

As illustrated in FIG. 1, the cloud provider network 120 can communicate over the network 104 with the user computing devices 102. The network 104 can include any appropriate network, including an intranet, the Internet, a cellular network, a local area network, a global area network, a public network, a private network, or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. The user computing devices 102 can include any network-equipped computing device, for example, desktop computers, laptops, smartphones, tablets, e-readers, gaming consoles, and the like. The user computing devices 102 can also include or can be integrated into industrial equipment, farm machinery, home appliances, manufacturing devices, industrial printers, automobiles, thermostats, sensor devices, smart traffic lights, vehicles, buildings, and the like. Users can access the cloud provider network 120 via the network 104 to view or manage their data and computing resources, as well as to use websites and/or applications hosted by the cloud provider network 120.

The cloud provider network 120 may implement various computing resources or services, which may include a virtual compute service (referred to in various implementations as an elastic compute service, a virtual machines service, a computing cloud service, a compute engine, or a cloud compute service), a container orchestration and management service (referred to in various implementations as a container service, cloud container service, container engine, or container cloud service), a Kubernetes-based container orchestration and management service (referred to in various implementations as a container service for Kubernetes, Azure Kubernetes service, IBM cloud Kubernetes service, Kubernetes engine, or container engine for Kubernetes), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account (or across multiple accounts) associated with the cloud provider network 120, in contrast to resources requested by users of the cloud provider network 120, which may be provisioned in one or more user accounts.

The cloud provider network 120 can be formed as a number of regions, where a region is a separate geographical area in which the cloud provider network 102 clusters data centers. Each region can include two or more availability zones connected to one another via a private high-speed network, for example, a fiber communication connection. An availability zone refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions and/or availability zones by way of edge locations and regional edge cache servers. This compartmentalization and geographic distribution of computing hardware enables the cloud provider network to provide low latency resource access to customers on a global scale with a high degree of fault tolerance and stability. Some or all of the components illustrated in FIG. 1 may be implemented in separate availability zones, separate regions, separate networks, separate edge cache nodes or points of presence, and/or separate user accounts.

Example Arrangement of Data Blocks and Snapshots

Figure 2:
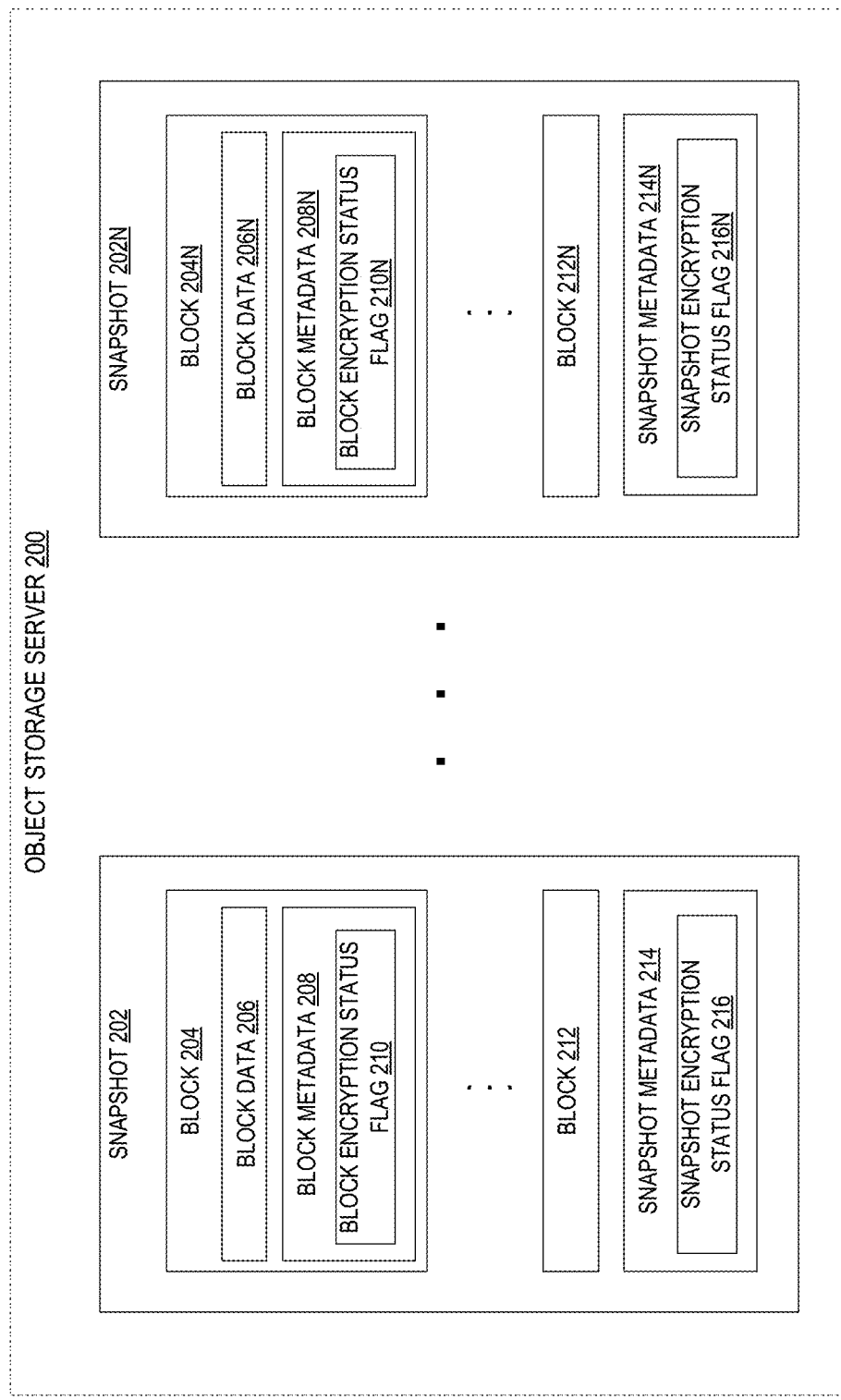
FIG. 2 depicts a schematic diagram of snapshots stored on an object storage server in accordance with aspects of the present disclosure.

FIG. 2 depicts an example arrangement of data blocks and snapshots stored on an object storage server 200. As shown in FIG. 2, a snapshot 202 includes blocks 204 through 212 (which may include any number of data blocks) and snapshot metadata 214, which includes a snapshot encryption status flag 216. The block 204 includes block data 206 and block metadata 208, which includes a block encryption status flag 210. The block data 206 may be a sequence of bytes or bits representative of certain information intended to be stored by a user or computing system, and the block metadata 208 may be a data structure or other collection of information about the block 204 and/or the block data 206. The object storage server 200 may also store any number of snapshots, including snapshot 202N, which includes blocks 204N through 212N (which may include any number of data blocks) and snapshot metadata 214N, which includes a snapshot encryption status flag 214N, where the block 204N includes block data 206N and block metadata 208N, which includes a block encryption status flag 210N. Although the encryption status flags 210 and 216 are shown in FIG. 2 as being part of the block 204 and the snapshot 202, respectively, in other embodiments, the encryption status flags 210 and 214 are stored separately from the block 204 and snapshot 202 and are not part of the block 204 and snapshot 202.

The block encryption status flag 210 indicates an encryption state of the block 204. For example, the block encryption status flag 210 may be set to 0 if the block data 206 is unencrypted (or in an unencrypted state), and 1 if the block data 206 is encrypted (or in an encrypted state). The snapshot encryption status flag 216 indicates an encryption state of the snapshot 202. For example, the snapshot encryption status flag 216 may be set to 0 if all of the data blocks within the snapshot 202 are unencrypted (or in an unencrypted state), 1 if all of the data blocks within the snapshot 202 are encrypted (or in an encrypted state), and 2 if one or more data blocks within the snapshot 202 are unencrypted and one or more data blocks within the snapshot 202 are encrypted. The control plane 155 may update the value of the block encryption status flag 210 to reflect the change in the encryption status of the block 204, and update the value of the snapshot encryption status flag 216 to reflect the change in the encryption status of the snapshot 202.

Example Routine for Encrypting a Snapshot Using a Partially Encrypted State

Figure 3:
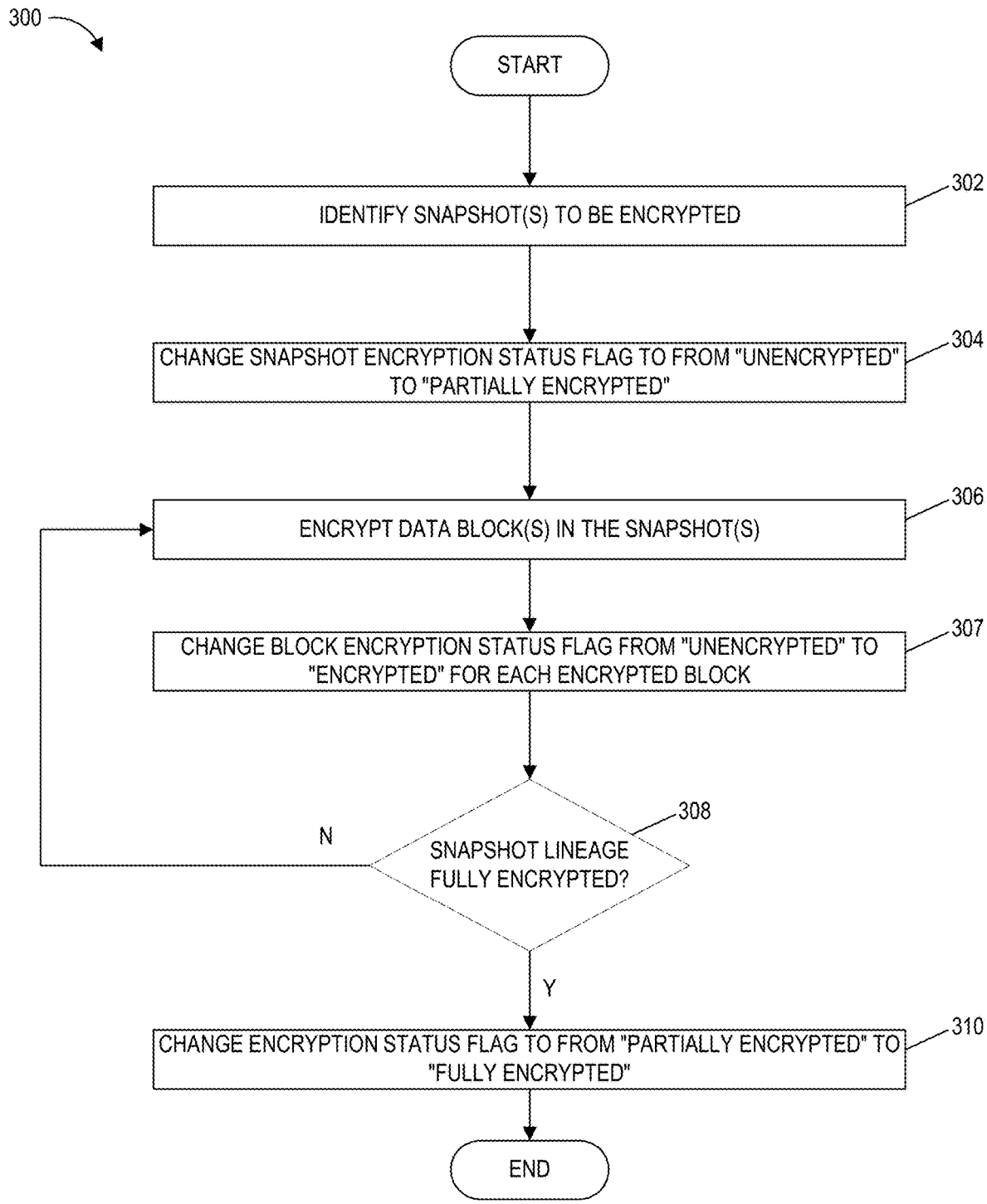
FIG. 3 is a flowchart of an example process for encrypting a snapshot using a partially encrypted state in accordance with aspects of the present disclosure.

FIG. 3 depicts an illustrative routine 300 for encrypting a snapshot using a partially encrypted state in accordance with aspects of the present disclosure. The routine 300 may be carried out, for example, by the control plane 155 (e.g., control plane components of the block store servers 105, the object storage servers 110, and/or the encryption servers 115) or one or more other components of the cloud provider network 120 described herein. For convenience, some or all of the steps of the routine 300 are described as being performed by the control plane 155. For example, components of the control plane 155 may include one or more hardware computing devices and non-transitory physical computer storage storing instructions that, when executed by the one or more hardware computing devices, cause the one or more hardware computing devices to perform the steps of the routine 300.

The routine 300 begins at block 302, at which the control plane 155 identifies a snapshot to be encrypted. The snapshot may be associated with a snapshot encryption status flag indicating that the snapshot is in an unencrypted state (e.g., each data block or data chunk included in the snapshot is unencrypted). In some embodiments, multiple snapshots may be identified at block 302 (e.g., a child snapshot, a parent snapshot, and a parent of the parent snapshot).

At block 304, the control plane 155 changes the snapshot encryption status flag associated with the snapshot to indicate that the snapshot is in a partially encrypted state.

At block 306, the control plane 155 encrypts one or more data blocks in the snapshot (or data blocks in one or more parent snapshots of the snapshot).

At block 307, the control plane 155 changes the block encryption status flag from an unencrypted state to an encrypted state for each block encrypted at block 306.

At block 308, the control plane 155 determines whether the snapshot lineage associated with the snapshot is fully encrypted. The snapshot lineage may include one or more parent snapshots on which the snapshot depends. For example, the snapshot lineage may include a grandparent snapshot from which a parent snapshot was created, and the parent snapshot from which the current snapshot (e.g., the snapshot whose encryption status flag was changed at block 304) was created. In such an example, the control plane 155 may determine whether each of the grandparent snapshot and the parent snapshot is associated with an encryption status flag indicating that the parent snapshot is in an encrypted state. The determination at block 308 may also include a determination of whether all of the data blocks or data chunks of the snapshot have been encrypted. If the control plane 155 determines that the snapshot lineage is fully encrypted (e.g., each parent snapshot is in an encrypted state, and all of the data blocks or data chunks of the snapshot have been encrypted), the routine 300 proceeds to block 310. Otherwise, the routine 310 returns to block 306 to encrypt one or more additional data chunks in the snapshot (or in a parent snapshot of the snapshot).

At block 310, the control plane 155 changes the encryption status flag associated with the snapshot to indicate that the snapshot is in an encrypted state. The routine 300 may then end.

The routine 300 can include fewer, more, or different blocks than those illustrated in FIG. 3 and/or one or more blocks illustrated in FIG. 3 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the user computing device 102 disclosed herein.

Figure 4:
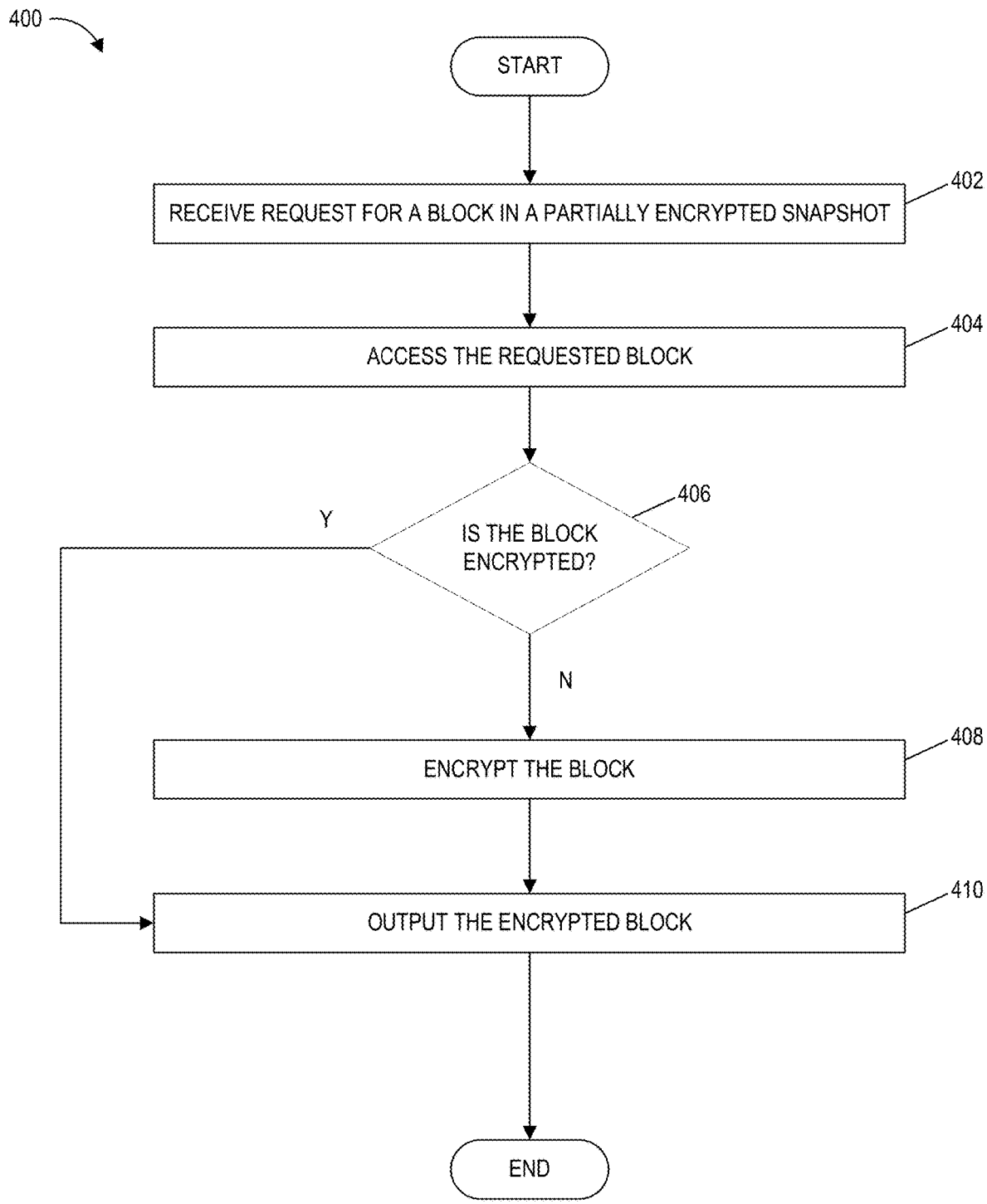
FIG. 4 is a flowchart of an example process for hydrating an encrypted volume from a partially encrypted snapshot in accordance with aspects of the present disclosure.

Example Routine for Hydrating an Encrypted Volume from a Partially Encrypted Snapshot FIG. 4 depicts an illustrative routine 400 for hydrating an encrypted volume from a partially encrypted snapshot in accordance with aspects of the present disclosure. The routine 400 may be carried out, for example, by the control plane 155 (e.g., control plane components of the block store servers 105, the object storage servers 110, and/or the encryption servers 115) or one or more other components of the cloud provider network 120 described herein. For convenience, some or all of the steps of the routine 400 are described as being performed by the control plane 155. For example, components of the control plane 155 may include one or more hardware computing devices and non-transitory physical computer storage storing instructions that, when executed by the one or more hardware computing devices, cause the one or more hardware computing devices to perform the steps of the routine 400.

The routine 400 begins at block 402, at which the control plane 155 receives a request for a data block in a snapshot that is in a partially encrypted state. For example, the request may be received to hydrate an encrypted volume that was previously created based on the snapshot. In some cases, the request may identify multiple data blocks in the snapshot.

At block 404, the control plane 155 accesses the requested data block in the snapshot. If multiple data blocks are requested, the control plane 155 may access multiple data blocks (or alternatively, repeat blocks 404-410 for each data block). The accessed data blocks may include all encrypted data blocks, all unencrypted data blocks, or a mix of encrypted data block(s) and unencrypted data block(s).

At block 406, the control plane 155 determines whether the data block is encrypted. For example, the control plane 155 may check a block-level encryption status flag associated with the data block (or a chunk-level encryption status flag associated with the data chunk including the data block) to determine whether the data block is encrypted. If the control plane 155 determines that the data block is encrypted, the routine 400 proceeds to block 410. Otherwise, the routine 400 proceeds to block 408.

At block 408, the control plane 155 causes the data block to be encrypted. In some embodiments, the data block in the snapshot is also encrypted (e.g., not just the copy being returned to the requestor) and the control plane 155 causes the encryption status flag associated with the data block (or the data chunk including the data block) to be changed to an encrypted state. In other embodiments, the data block in the snapshot remains unencrypted (e.g., only the copy being returned to the requestor is encrypted) and the control plane 155 does not cause the encryption status flag associated with the data block (or the data chunk including the data block) in the snapshot to be changed to an encrypted state.

At block 410, the control plane 155 outputs the encrypted data block. The routine 400 may then end.

The routine 400 can include fewer, more, or different blocks than those illustrated in FIG. 4 and/or one or more blocks illustrated in FIG. 4 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the user computing device 102 disclosed herein.

Figure 5:
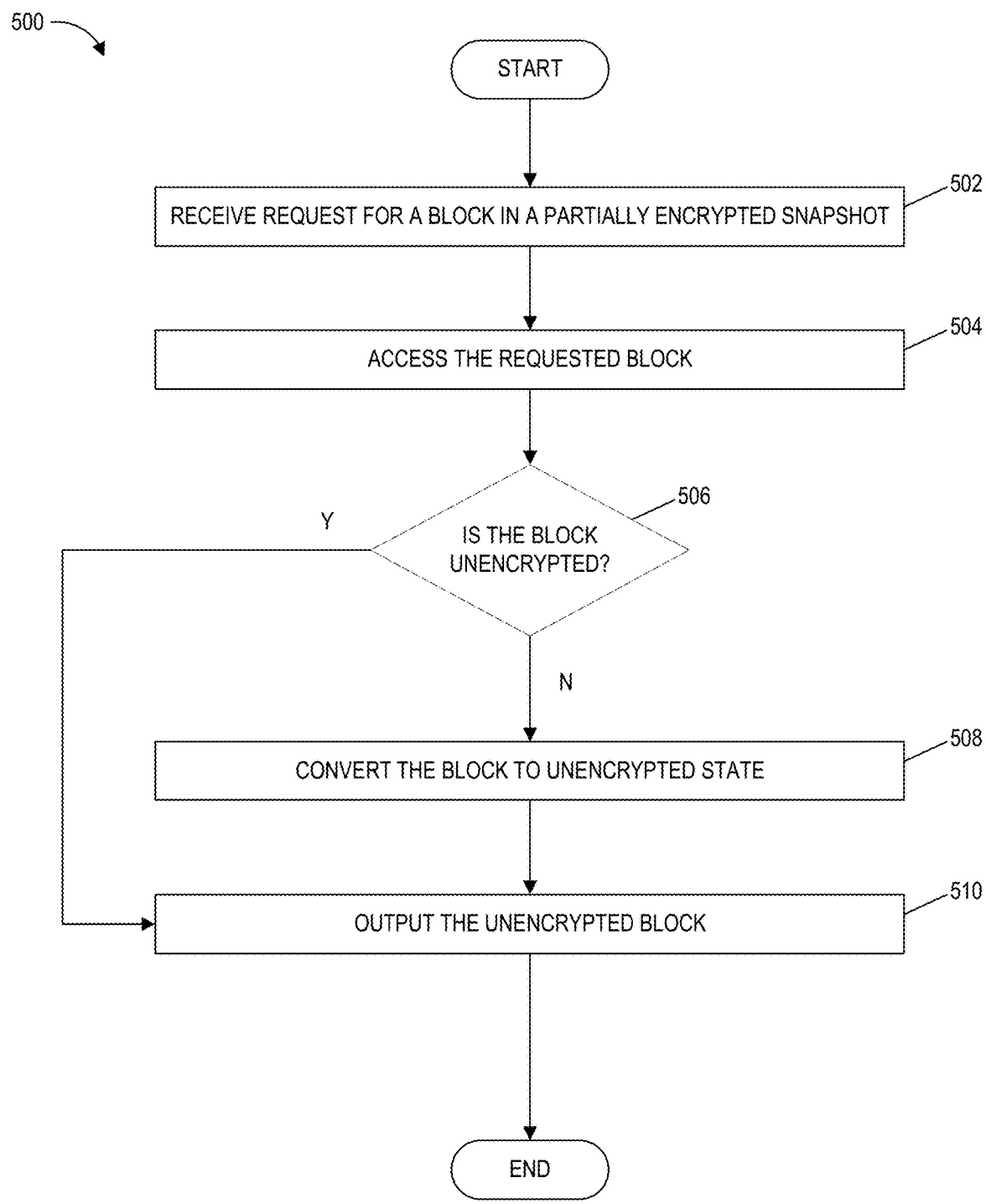
FIG. 5 is a flowchart of an example process for hydrating a pre-created unencrypted volume from a partially encrypted snapshot in accordance with aspects of the present disclosure.

Example Routine for Hydrating a Pre-Created Unencrypted Volume from a Partially Encrypted Snapshot FIG. 5 depicts an illustrative routine 500 for hydrating a pre-created unencrypted volume from a partially encrypted snapshot in accordance with aspects of the present disclosure. The term "pre-created" as used herein may refer to being created prior to encryption of the partially encrypted snapshot. For example, the volume may have been created based on an unencrypted snapshot, and one or more blocks of the unencrypted snapshot may have been subsequently converted to an encrypted state (thereby causing the snapshot to be a partially encrypted snapshot). The routine 500 may be carried out, for example, by the control plane 155 (e.g., control plane components of the block store servers 105, the object storage servers 110, and/or the encryption servers 115) or one or more other components of the cloud provider network 120 described herein. For convenience, some or all of the steps of the routine 500 are described as being performed by the control plane 155. For example, components of the control plane 155 may include one or more hardware computing devices and non-transitory physical computer storage storing instructions that, when executed by the one or more hardware computing devices, cause the one or more hardware computing devices to perform the steps of the routine 500.

The routine 500 begins at block 502, at which the control plane 155 receives a request for a data block in a snapshot that is in a partially encrypted state. For example, the request may be received to hydrate an unencrypted volume that was previously created based on the snapshot. In some cases, the request may identify multiple data blocks in the snapshot.

At block 504, the control plane 155 accesses the requested data block in the snapshot. If multiple data blocks are requested, the control plane 155 may access multiple data blocks (or alternatively, repeat blocks 504-510 for each data block). The accessed data blocks may include all encrypted data blocks, all unencrypted data blocks, or a mix of encrypted data block(s) and unencrypted data block(s).

At block 506, the control plane 155 determines whether the data block is unencrypted. For example, the control plane 155 may check a block-level encryption status flag associated with the data block (or a chunk-level encryption status flag associated with the data chunk including the data block) to determine whether the data block is encrypted. If the control plane 155 determines that the data block is unencrypted, the routine 500 proceeds to block 510. Otherwise, the routine 500 proceeds to block 508.

At block 508, the control plane 155 causes the data block to be converted to an unencrypted state (e.g., by decrypting the data block). In some embodiments, the encrypted data block in the snapshot is also converted to an unencrypted state (e.g., not just the copy being returned to the requestor) and the control plane 155 causes the encryption status flag associated with the data block (or the data chunk including the data block) to be changed to an unencrypted state. In other embodiments, the data block in the snapshot remains encrypted (e.g., only the copy being returned to the requestor is decrypted) and the control plane 155 does not cause the encryption status flag associated with the data block (or the data chunk including the data block) in the snapshot to be changed to an unencrypted state.

At block 510, the control plane 155 outputs the unencrypted data block. The routine 500 may then end.

The routine 500 can include fewer, more, or different blocks than those illustrated in FIG. 5 and/or one or more blocks illustrated in FIG. 5 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the user computing device 102 disclosed herein.

Figure 6:
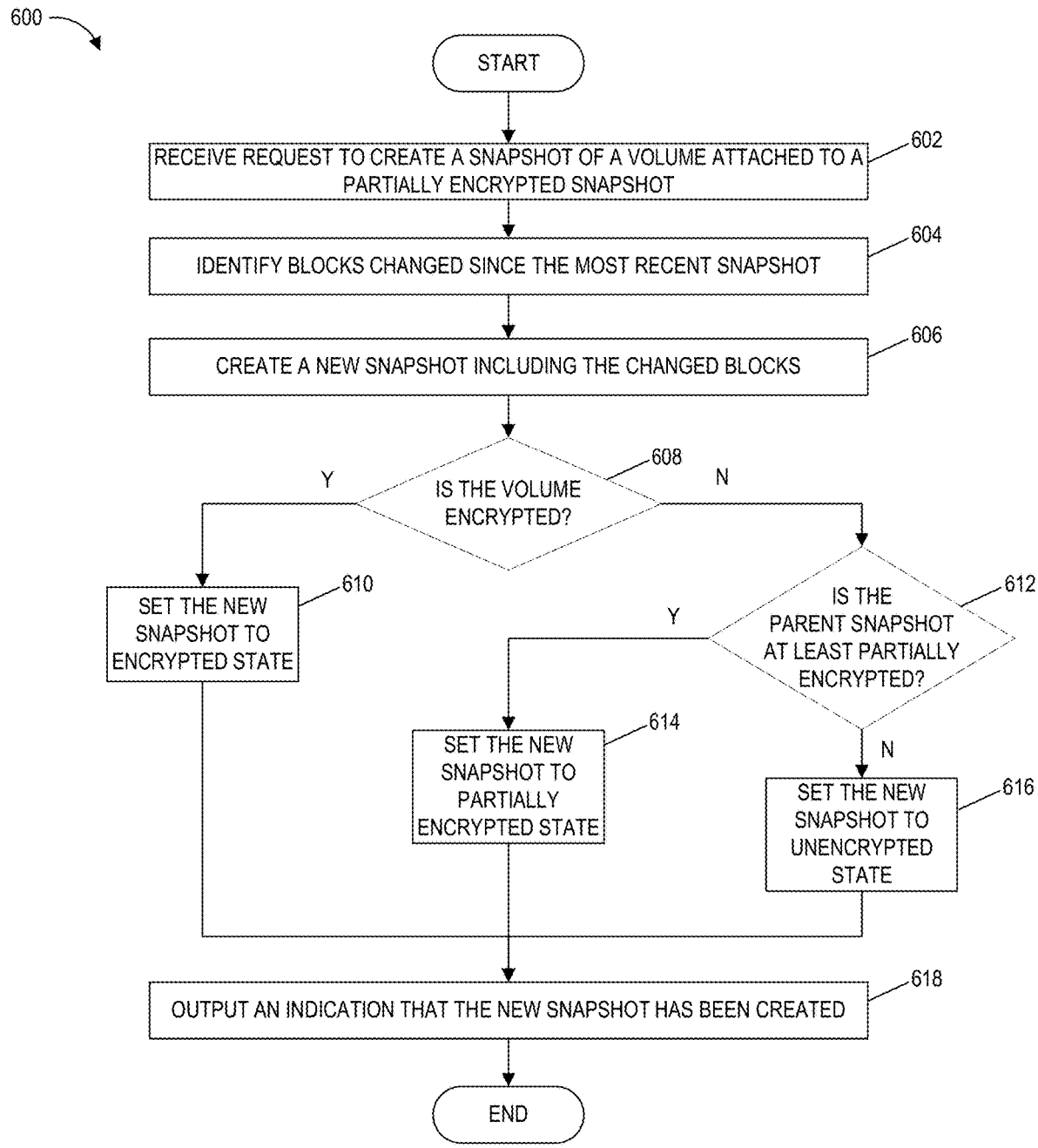
FIG. 6 is a flowchart of an example process for creating a new snapshot of a volume attached to a partially encrypted snapshot in accordance with aspects of the present disclosure.

Example Routine for Creating a New Snapshot of a Volume Attached to a Partially Encrypted Snapshot FIG. 6 depicts an illustrative routine 600 for creating a new snapshot of a volume attached to a partially encrypted snapshot in accordance with aspects of the present disclosure. The routine 600 may be carried out, for example, by the control plane 155 (e.g., control plane components of the block store servers 105, the object storage servers 110, and/or the encryption servers 115) or one or more other components of the cloud provider network 120 described herein. For convenience, some or all of the steps of the routine 600 are described as being performed by the control plane 155. For example, components of the control plane 155 may include one or more hardware computing devices and non-transitory physical computer storage storing instructions that, when executed by the one or more hardware computing devices, cause the one or more hardware computing devices to perform the steps of the routine 600.

The routine 600 begins at block 602, at which the control plane 155 receives a request to create a snapshot of a volume attached to a partially encrypted snapshot. For example, the volume may have been created based on an unencrypted snapshot, and the unencrypted snapshot may have been converted to a partially encrypted snapshot subsequent to the creation of the volume. After changes have been made to the volume, the request of block 602 may have been received to create another snapshot (e.g., incremental snapshot) to capture the changes made to the volume.

At block 604, the control plane 155 identifies one or more data blocks that have changed since the most recent snapshot creation.

At block 606, the control plane 155 creates a new snapshot including the changed data blocks. For example, the new snapshot may not include data blocks that are included in one of its parent snapshots and have not changed since the inclusion in the parent snapshot.

At block 608, the control plane 155 determines whether the volume for which the creation of the snapshot has been requested is encrypted. The volume may have been created from an encrypted snapshot, in which case the volume may be in an encrypted state. In another case, the volume may have been created as an encrypted volume from an unencrypted snapshot. In yet another case, the volume may have been created as an unencrypted volume from an unencrypted snapshot. In such a case, the volume may have been left unencrypted or may have subsequently been encrypted. If the control plane 155 determines that the volume is encrypted, the routine 600 proceeds to block 610, where the control plane 155 sets the new snapshot to an encrypted state. If the control plane 155 determines that the volume is not encrypted, the routine 600 proceeds to block 612.

At block 612, the control plane 155 determines whether the parent snapshot (e.g., the snapshot, or one of the snapshots, from which the volume was originally created) is at least partially encrypted (e.g., fully encrypted or partially encrypted). If so, the routine 600 proceeds to block 614, where the control plane 155 sets the new snapshot to a partially encrypted state. Otherwise, the routine 600 proceeds to block 616, where the control plane 155 sets the new snapshot to an unencrypted state.

At each of blocks 610, 614, and 616, the control plane 155 may set the snapshot encryption status flag of the new snapshot to indicate that the state of the new snapshot. At block 618, the control plane 155 outputs an indication that the new snapshot has been created. The routine 600 may then end.

The routine 600 can include fewer, more, or different blocks than those illustrated in FIG. 6 and/or one or more blocks illustrated in FIG. 6 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Creating a New Volume Based on a Snapshot

Figure 7:
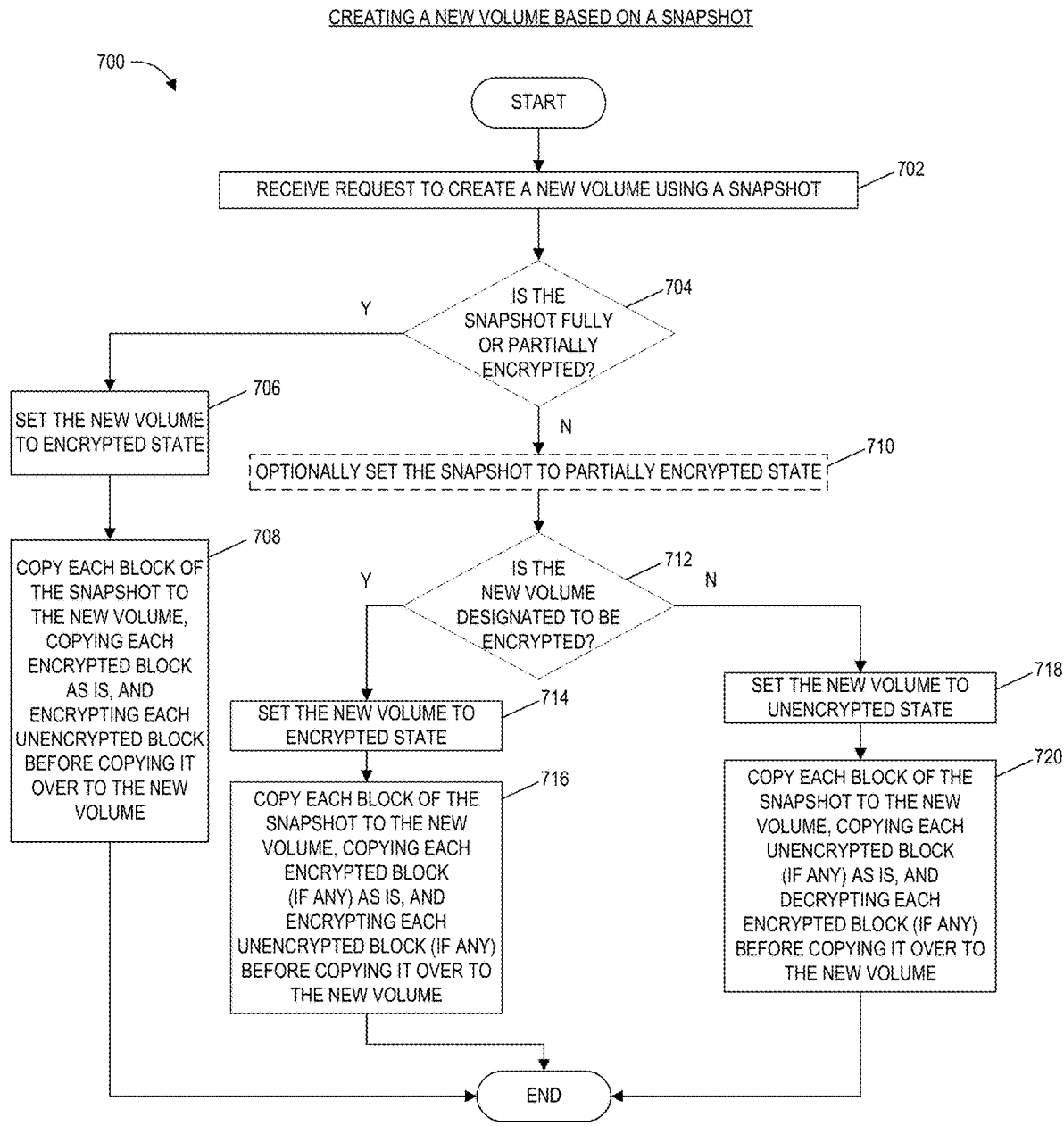
FIG. 7 is a flowchart of an example process for creating a new volume based on a snapshot in accordance with aspects of the present disclosure.

FIG. 7 depicts an illustrative routine 700 for creating a new volume based on a snapshot in accordance with aspects of the present disclosure. The routine 700 may be carried out, for example, by the control plane 155 (e.g., control plane components of the block store servers 105, the object storage servers 110, and/or the encryption servers 115) or one or more other components of the cloud provider network 120 described herein. For convenience, some or all of the steps of the routine 700 are described as being performed by the control plane 155. For example, components of the control plane 155 may include one or more hardware computing devices and non-transitory physical computer storage storing instructions that, when executed by the one or more hardware computing devices, cause the one or more hardware computing devices to perform the steps of the routine 700.

The routine 700 begins at block 702, at which the control plane 155 receives a request to create a new volume using a snapshot. For example, the snapshot may be stored in a high durability data store, and in response to the request received at block 702, the control plane 155 may create a volume on a low latency data store accessible by users of the volume and copy the data blocks in the snapshot over to the volume stored on the low latency data store.

At block 704, the control plane 155 determines whether the snapshot is fully encrypted (e.g., does not include any unencrypted blocks) or partially encrypted (e.g., includes at least one encrypted block and at least one unencrypted block). If the control plane 155 determines that the snapshot is fully encrypted or partially encrypted, the routine 700 proceeds to block 706, where the control plane 155 sets the new volume to an encrypted state, and at block 708, copies each block of the snapshot to the new volume, copying each encrypted block as is, and encrypting each unencrypted block before copying it over to the new volume. If the control plane 155 determines that the snapshot is neither fully encrypted nor partially encrypted, the routine 700 proceeds to block 710.

At block 710, the control plane 155 may optionally set the snapshot to a partially encrypted state. For example, subsequent to the determination at block 704, the control plane 155 may determine that the snapshot is to be encrypted (e.g., in response to a user request or by operation of a policy within the cloud provider network 120 such as encrypting snapshots by default). In such a case, the control plane 155 may set the encryption status of the snapshot to partially encrypted and begin encrypting the blocks within the snapshot. In other embodiments, the control plane 155 does not set the snapshot to a partially encrypted state.

At block 712, the control plane 155 determines whether the new volume is designated to be in a fully encrypted state. For example, the user associated with the new volume (e.g., the user who requested the creation of the new volume based on the snapshot) may indicate whether the new volume should be in an encrypted state or an unencrypted state. As another example, a policy within the cloud provider network 120 may dictate whether the new volume should be in an encrypted state or an unencrypted state. In such an example, the cloud provider network 120 may have a policy that indicates that all new volumes should be in an encrypted state, that all new volumes created from a fully or partially encrypted snapshot should be in an encrypted state, and/or that all new volumes created from an unencrypted snapshot should be in an unencrypted state, to name a few examples.

If the control plane 155 determines that the new volume should be in an encrypted state, the routine 700 proceeds to block 714, where the control plane 155 sets the new volume to an encrypted state, and at block 716, copies each block of the snapshot to the new volume by copying each encrypted block (if any) as is, and encrypting each unencrypted block (if any) before copying it over to the new volume.

If the control plane 155 determines that the new volume is not designated to be in an encrypted state (and should instead be in an unencrypted state), the routine 700 proceeds to block 718, where the control plane 155 sets the new volume to an unencrypted state, and at block 720, copies each block of the snapshot to the new volume by copying each unencrypted block (if any) as is, and decrypting each encrypted block (if any) before copying it over to the new volume. The routine 700 may then end.

The routine 700 can include fewer, more, or different blocks than those illustrated in FIG. 7 and/or one or more blocks illustrated in FIG. 7 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Copying a Source Snapshot

Figure 8:
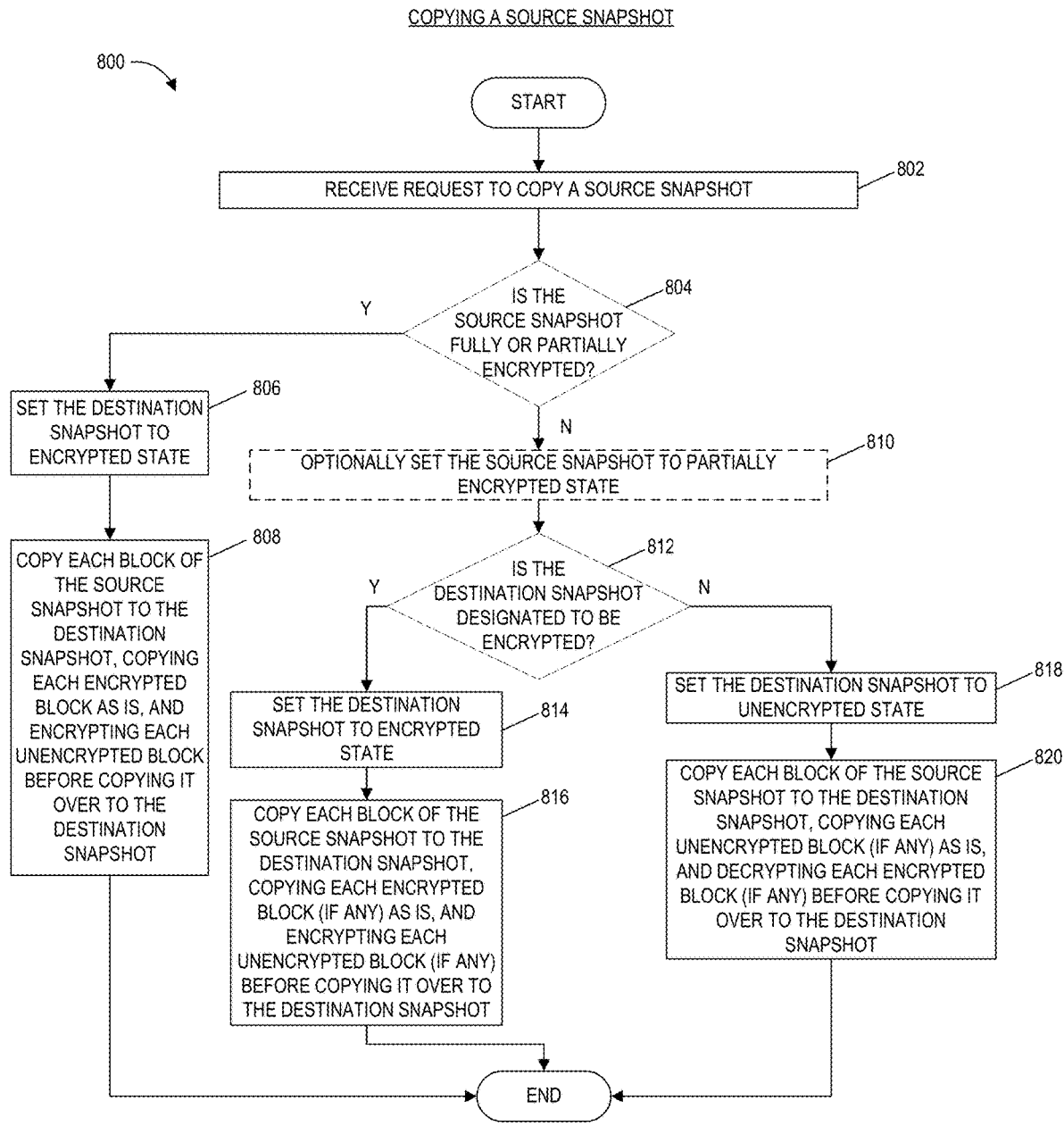
FIG. 8 is a flowchart of an example process for copying a source snapshot in accordance with aspects of the present disclosure.

FIG. 8 depicts an illustrative routine 800 for copying a source snapshot in accordance with aspects of the present disclosure. The routine 800 may be carried out, for example, by the control plane 155 (e.g., control plane components of the block store servers 105, the object storage servers 110, and/or the encryption servers 115) or one or more other components of the cloud provider network 120 described herein. For convenience, some or all of the steps of the routine 800 are described as being performed by the control plane 155. For example, components of the control plane 155 may include one or more hardware computing devices and non-transitory physical computer storage storing instructions that, when executed by the one or more hardware computing devices, cause the one or more hardware computing devices to perform the steps of the routine 800.

The routine 800 begins at block 802, at which the control plane 155 receives a request to copy a source snapshot to a destination. For example, the snapshot that is stored in one storage device may be copied to another storage device to make the snapshot available in another region, another storage device, or another user account. In some cases, subsequent to the copying, the copied snapshot ("new snapshot" or "destination snapshot") may be associated with an encryption key that is different from that associated with the source snapshot.

At block 804, the control plane 155 determines whether the source snapshot is fully encrypted (e.g., does not include any unencrypted blocks) or partially encrypted (e.g., includes at least one encrypted block and at least one unencrypted block). If the control plane 155 determines that the source snapshot is fully encrypted or partially encrypted, the routine 800 proceeds to block 806, where the control plane 155 sets the destination snapshot to an encrypted state, and at block 808, copies each block of the source snapshot to the destination snapshot, copying each encrypted block as is, and encrypting each unencrypted block before copying it over to the destination snapshot. If the control plane 155 determines that the source snapshot is neither fully encrypted nor partially encrypted, the routine 800 proceeds to block 810.

At block 810, the control plane 155 may optionally set the source snapshot to a partially encrypted state. For example, subsequent to the determination at block 804, the control plane 155 may determine that the source snapshot is to be encrypted (e.g., in response to a user request or by operation of a policy within the cloud provider network 120 such as encrypting source snapshots by default). In such a case, the control plane 155 may set the encryption status of the source snapshot to partially encrypted and begin encrypting the blocks within the source snapshot. In other embodiments, the control plane 155 does not set the source snapshot to a partially encrypted state.

At block 812, the control plane 155 determines whether the destination snapshot is designated to be in a fully encrypted state. For example, the user associated with the destination snapshot (e.g., the user who requested the creation of the destination snapshot based on the source snapshot) may indicate whether the destination snapshot should be in an encrypted state or an unencrypted state. As another example, a policy within the cloud provider network 120 may dictate whether the destination snapshot should be in an encrypted state or an unencrypted state. In such an example, the cloud provider network 120 may have a policy that indicates that all destination snapshots should be in an encrypted state, that all destination snapshots created from a fully or partially encrypted source snapshot should be in an encrypted state, and/or that all destination snapshots created from an unencrypted source snapshot should be in an unencrypted state, to name a few examples.

If the control plane 155 determines that the destination snapshot should be in an encrypted state, the routine 800 proceeds to block 814, where the control plane 155 sets the destination snapshot to an encrypted state, and at block 816, copies each block of the source snapshot to the destination snapshot by copying each encrypted block (if any) as is, and encrypting each unencrypted block (if any) before copying it over to the destination snapshot.

If the control plane 155 determines that the destination snapshot is not designated to be in an encrypted state (and should instead be in an unencrypted state), the routine 800 proceeds to block 818, where the control plane 155 sets the destination snapshot to an unencrypted state, and at block 820, copies each block of the source snapshot to the destination snapshot by copying each unencrypted block (if any) as is, and decrypting each encrypted block (if any) before copying it over to the destination snapshot. The routine 800 may then end.

The routine 800 can include fewer, more, or different blocks than those illustrated in FIG. 8 and/or one or more blocks illustrated in FIG. 8 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Architecture of Computing System

Figure 9:
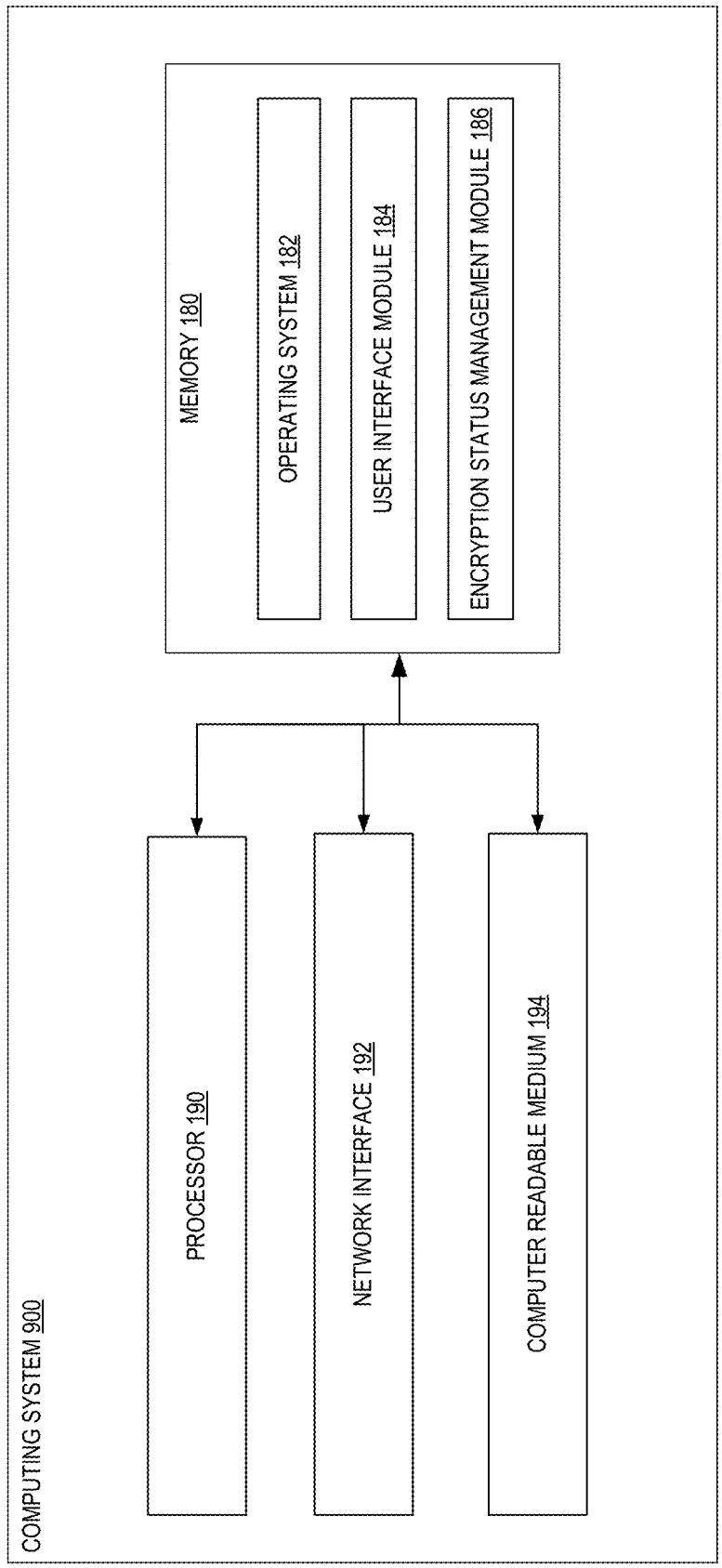
FIG. 9 depicts a general architecture of a computing system usable to implement one or more components described herein in accordance with aspects of the present disclosure.

FIG. 9 depicts an example architecture of a computing system 900 that can be used to perform one or more of the techniques described herein or illustrated in FIGS. 1-8. The general architecture of the computing system 900 depicted in FIG. 9 includes an arrangement of computer hardware and software modules that may be used to implement one or more aspects of the present disclosure. The computing system 900 may include many more (or fewer) elements than those shown in FIG. 9. It is not necessary, however, that all of these elements be shown in order to provide an enabling disclosure. For example, the computing system 900 may be used to implement one or more of the elements described herein, including the block store servers 105, the object storage servers 110, the encryption servers 115, and/or the user computing devices 102.

As illustrated, the computing system 900 includes a processor 190, a network interface 192, and a computer-readable medium 194, all of which may communicate with one another by way of a communication bus. The network interface 192 may provide connectivity to one or more networks or computing systems. The processor 190 may thus receive information and instructions from other computing systems or services via the network 104 illustrated in FIG. 1.

The processor 190 may also communicate with memory 180. The memory 180 may contain computer program instructions (grouped as modules in some embodiments) that the processor 190 executes in order to implement one or more aspects of the present disclosure. The memory 180 may include RAM, ROM, and/or other persistent, auxiliary, or non-transitory computer-readable media. The memory 180 may store an operating system 182 that provides computer program instructions for use by the processor 190 in the general administration and operation of the computing system 900. The memory 180 may further include computer program instructions and other information for implementing one or more aspects of the present disclosure. For example, in one embodiment, the memory 180 includes a user interface module 184 that generates user interfaces (and/or instructions therefor) for display upon a user computing device (e.g., user computing device 102 of FIG. 1), e.g., via a navigation and/or browsing interface such as a browser or application installed on the user computing device. In addition, the memory 180 may include or communicate with one or more data stores.

In addition to and/or in combination with the user interface module 184, the memory 180 may include an encryption status management module 186 that may be executed by the processor 190. In one embodiment, the encryption status management module 186 implements various aspects of the present disclosure, e.g., those illustrated in FIGS. 1-8 or described with reference to FIGS. 1-8.

Although a single processor, a single network interface, a single computer-readable medium, and a single memory are illustrated in the example of FIG. 9, in other implementations, the computing system 900 can have a multiple of one or more of these components (e.g., two or more processors and/or two or more memories).

Enumerated Implementations (EIs)

Some examples of enumerated implementations (EIs) are provided in this section, without limitation.

EI 1: A cloud provider system comprising: a first set of servers having stored thereon a volume of data, wherein the volume includes a plurality of data blocks; a second set of servers having stored thereon a snapshot of the volume of data, wherein the snapshot represents a copy of the volume at a point in time and includes copies of the plurality of data blocks present on the volume at the point in time; and a third set of servers in communication with the first set of servers and the second set of servers, wherein the third set of servers is configured to: determine that the snapshot stored on the second set of servers is to be encrypted, wherein the snapshot is associated with a snapshot-level encryption status having a first value indicating that the snapshot is in an unencrypted state; set the snapshot-level encryption status associated with the snapshot to a second value indicating that the snapshot is in a partially encrypted state; initiate encryption of at least one of the plurality of data blocks included in the snapshot; prior to all of the plurality of data blocks being encrypted, receive a read request to access a first data block of the plurality of data blocks; in response to the read request, determine a block-level encryption status associated with the first data block, wherein the block-level encryption status indicates that the first data block is in a state other than a partially encrypted state; output the first data block based on the block-level encryption status associated with the first data block; determine that all of the plurality of data blocks included in the snapshot have been encrypted; and set the snapshot-level encryption status associated with the snapshot to a third value indicating that the snapshot is in an encrypted state.

EI 2: The cloud provider system of EI 1, wherein the third set of servers is configured to (i) determine that the read request is originating from an encrypted volume stored on the first set of servers and that the block-level encryption status indicates that the first data block is unencrypted, (ii) encrypt the first data block, and (iii) output the encrypted first data block to the encrypted volume.

EI 3: The cloud provider system of EI 1, wherein the third set of servers is configured to (i) determine that the read request is originating from an unencrypted volume stored on the first set of servers and that the block-level encryption status indicates that the first data block is encrypted, (ii) decrypt the first data block, and (iii) output the decrypted first data block to the unencrypted volume.

EI 4: The cloud provider system of EI 1, wherein the third set of servers is configured to set the snapshot-level encryption status associated with the snapshot to the third value based on determining that all of the plurality of data blocks have been encrypted and that all parent snapshots associated with the snapshot are in an encrypted state.

EI 5: A computer-implemented method comprising: determining that a snapshot representative of a volume of data is to be encrypted, wherein the snapshot is associated with a first encryption status having a first value indicating that the snapshot is in an unencrypted state; setting the first encryption status associated with the snapshot to a second value indicating that the snapshot is in a partially encrypted state; initiating encryption of at least one of a plurality of data blocks included in the snapshot; prior to all of the plurality of data blocks being encrypted, receiving a read request to access a first data block of the plurality of data blocks; in response to the read request, determining a second encryption status associated with the first data block, wherein the second encryption status indicates that the first data block is in a state other than a partially encrypted state; and outputting the first data block based on the second encryption status associated with the first data block.

EI 6: The computer-implemented method of EI 5, further comprising (i) determining that the read request is originating from an encrypted volume and that the first data block is unencrypted, (ii) encrypting the first data block, and (iii) outputting the encrypted first data block to the encrypted volume.

EI 7: The computer-implemented method of EI 6, further comprising receiving, prior to all of the plurality of data blocks of the snapshot being encrypted, another read request to access a second data block from the encrypted volume, determining that the second data block is encrypted, and outputting the second data block to the encrypted volume without performing any additional encryption on the second data block.

EI 8: The computer-implemented method of EI 5, further comprising (i) determining that the read request is originating from an unencrypted volume and that the first data block is encrypted, (ii) decrypting the first data block, and (iii) outputting the decrypted first data block to the unencrypted volume.

EI 9: The computer-implemented method of EI 8, further comprising receiving, prior to all of the plurality of data blocks of the snapshot being encrypted, another read request to access a second data block from the unencrypted volume, determining that the second data block is unencrypted, and outputting the second data block to the unencrypted volume without performing any additional decryption on the second data block.

EI 10: The computer-implemented method of EI 5, further comprising: determining that all of the plurality of data blocks included in the snapshot have been encrypted; and setting the first encryption status associated with the snapshot to a third value indicating that the snapshot is in an encrypted state.

EI 11: The computer-implemented method of EI 10, further comprising: determining that at least one parent snapshot associated with the snapshot is not in an encrypted state; and waiting until the at least one parent snapshot is in an encrypted state prior to setting the first encryption status to the third value.

EI 12: The computer-implemented method of EI 5, wherein the first encryption status is indicated by a snapshot encryption status flag stored as part of snapshot metadata associated with the snapshot, and the second encryption status is indicated by a block encryption status flag stored as part of block metadata associated with the first data block.

EI 13: Non-transitory computer-readable media comprising computer-executable instructions that, when executed on a computing system, cause the computing system to perform operations comprising: determining that a snapshot representative of a volume of data is to be encrypted, wherein the snapshot includes a plurality of blocks that are each in an unencrypted state; initiating encryption of at least one of the plurality of data blocks included in the snapshot; prior to all of the plurality of data blocks being encrypted, receiving a read request to access a first data block of the plurality of data blocks; in response to the read request, determining a block-level encryption status associated with the first data block; and outputting the first data block based on the block-level encryption status associated with the first data block.

EI 14: The non-transitory computer-readable media of EI 13, the operations further comprising (i) determining that the read request is originating from an encrypted volume and that the first data block is unencrypted, (ii) encrypting the first data block, and (iii) outputting the encrypted first data block to the encrypted volume.

EI 15: The non-transitory computer-readable media of EI 14, the operations further comprising receiving, prior to all of the plurality of data blocks of the snapshot being encrypted, another read request to access a second data block from the encrypted volume, determining that the second data block is encrypted, and outputting the second data block to the encrypted volume without performing any additional encryption on the second data block.

EI 16: The non-transitory computer-readable media of EI 13, the operations further comprising (i) determining that the read request is originating from an unencrypted volume and that the first data block is encrypted, (ii) decrypting the first data block, and (iii) outputting the decrypted first data block to the unencrypted volume.

EI 17: The non-transitory computer-readable media of EI 16, the operations further comprising receiving, prior to all of the plurality of data blocks of the snapshot being encrypted, another read request to access a second data block from the unencrypted volume, determining that the second data block is unencrypted, and outputting the second data block to the unencrypted volume without performing any additional decryption on the second data block.

EI 18: The non-transitory computer-readable media of EI 13, the operations further comprising: determining that all of the plurality of data blocks included in the snapshot have been encrypted; and setting a snapshot-level encryption status associated with the snapshot to a value indicating that the snapshot is in an encrypted state.

EI 19: The non-transitory computer-readable media of EI 18, the operations further comprising: determining that at least one parent snapshot associated with the snapshot is not in an encrypted state; and waiting until the at least one parent snapshot is in an encrypted state prior to setting the snapshot-level encryption status to the value indicating that the snapshot is in an encrypted state.

EI 20: The non-transitory computer-readable media of EI 13, wherein the block-level encryption status is indicated by a block encryption status flag stored as part of block metadata associated with the first data block.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The term "set" is used to include "one or more." For example, a set of objects may include a single object or multiple objects.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A cloud provider system comprising:
   a first set of servers having stored thereon a volume of data, wherein the volume includes a plurality of data blocks;
   a second set of servers having stored thereon a snapshot of the volume of data, wherein the snapshot represents a copy of the volume at a point in time and includes copies of the plurality of data blocks present on the volume at the point in time; and
   a third set of servers in communication with the first set of servers and the second set of servers, wherein the third set of servers is configured to:
   determine that the snapshot stored on the second set of servers is to be encrypted, wherein the snapshot is associated with a snapshot-level encryption status having a first value indicating that the snapshot is in an unencrypted state;
   set the snapshot-level encryption status associated with the snapshot to a second value indicating that the snapshot is in a partially encrypted state;
   initiate encryption of at least one of the plurality of data blocks included in the snapshot;

prior to all of the plurality of data blocks being encrypted, receive a read request to access a first data block of the plurality of data blocks;

in response to the read request, determine a block-level encryption status associated with the first data block, wherein the block-level encryption status indicates that the first data block is in a state other than a partially encrypted state;

output the first data block based on the block-level encryption status associated with the first data block;

determine that all of the plurality of data blocks included in the snapshot have been encrypted; and set the snapshot-level encryption status associated with the snapshot to a third value indicating that the snapshot is in an encrypted state.

2. The cloud provider system of claim 1, wherein the third set of servers is configured to (i) determine that the read request is originating from an encrypted volume stored on the first set of servers and that the block-level encryption status indicates that the first data block is unencrypted, (ii) encrypt the first data block, and (iii) output the encrypted first data block to the encrypted volume.

3. The cloud provider system of claim 1, wherein the third set of servers is configured to (i) determine that the read request is originating from an unencrypted volume stored on the first set of servers and that the block-level encryption status indicates that the first data block is encrypted, (ii) decrypt the first data block, and (iii) output the decrypted first data block to the unencrypted volume.

4. The cloud provider system of claim 1, wherein the third set of servers is configured to set the snapshot-level encryption status associated with the snapshot to the third value based on determining that all of the plurality of data blocks have been encrypted and that all parent snapshots associated with the snapshot are in an encrypted state.

5. A computer-implemented method comprising:

determining that a snapshot representative of a volume of data is to be encrypted, wherein the snapshot is associated with a first encryption status having a first value indicating that the snapshot is in an unencrypted state;

setting the first encryption status associated with the snapshot to a second value indicating that the snapshot is in a partially encrypted state;

initiating encryption of at least one of a plurality of data blocks included in the snapshot;

prior to all of the plurality of data blocks being encrypted, receiving a read request to access a first data block of the plurality of data blocks;

in response to the read request, determining a second encryption status associated with the first data block, wherein the second encryption status indicates that the first data block is in a state other than a partially encrypted state; and outputting the first data block based on the second encryption status associated with the first data block.

6. The computer-implemented method of claim 5, further comprising (i) determining that the read request is originating from an encrypted volume and that the first data block is unencrypted, (ii) encrypting the first data block, and (iii) outputting the encrypted first data block to the encrypted volume.

7. The computer-implemented method of claim 6, further comprising receiving, prior to all of the plurality of data blocks of the snapshot being encrypted, another read request to access a second data block from the encrypted volume, determining that the second data block is encrypted, and outputting the second data block to the encrypted volume without performing any additional encryption on the second data block.

8. The computer-implemented method of claim 5, further comprising (i) determining that the read request is originating from an unencrypted volume and that the first data block is encrypted, (ii) decrypting the first data block, and (iii) outputting the decrypted first data block to the unencrypted volume.

9. The computer-implemented method of claim 8, further comprising receiving, prior to all of the plurality of data blocks of the snapshot being encrypted, another read request to access a second data block from the unencrypted volume, determining that the second data block is unencrypted, and outputting the second data block to the unencrypted volume without performing any additional decryption on the second data block.

10. The computer-implemented method of claim 5, further comprising:

determining that all of the plurality of data blocks included in the snapshot have been encrypted; and setting the first encryption status associated with the snapshot to a third value indicating that the snapshot is in an encrypted state.

11. The computer-implemented method of claim 10, further comprising:

determining that at least one parent snapshot associated with the snapshot is not in an encrypted state; and waiting until the at least one parent snapshot is in an encrypted state prior to setting the first encryption status to the third value.

12. The computer-implemented method of claim 5, wherein the first encryption status is indicated by a snapshot encryption status flag stored as part of snapshot metadata associated with the snapshot, and the second encryption status is indicated by a block encryption status flag stored as part of block metadata associated with the first data block.

13. Non-transitory computer-readable media comprising computer-executable instructions that, when executed on a computing system, cause the computing system to perform operations comprising:

determining that a snapshot representative of a volume of data is to be encrypted, wherein the snapshot is associated with a snapshot-level encryption status having a first value indicating that the snapshot is in an unencrypted state;

initiating encryption of at least one of a plurality of data blocks included in the snapshot;

prior to all of the plurality of data blocks being encrypted, receiving a read request to access a first data block of the plurality of data blocks;

in response to the read request, determining a block-level encryption status associated with the first data block, wherein the block-level encryption status indicates that the first data block is in a state other than a partially encrypted state; and outputting the first data block based on the block-level encryption status associated with the first data block.

14. The non-transitory computer-readable media of claim 13, the operations further comprising (i) determining that the read request is originating from an encrypted volume and that the first data block is unencrypted, (ii) encrypting the first data block, and (iii) outputting the encrypted first data block to the encrypted volume.

15. The non-transitory computer-readable media of claim 14, the operations further comprising receiving, prior to all of the plurality of data blocks of the snapshot being encrypted, another read request to access a second data block from the encrypted volume, determining that the second data block is encrypted, and outputting the second data block to the encrypted volume without performing any additional encryption on the second data block.

16. The non-transitory computer-readable media of claim 13, the operations further comprising (i) determining that the read request is originating from an unencrypted volume and that the first data block is encrypted, (ii) decrypting the first data block, and (iii) outputting the decrypted first data block to the unencrypted volume.

17. The non-transitory computer-readable media of claim 16, the operations further comprising receiving, prior to all of the plurality of data blocks of the snapshot being encrypted, another read request to access a second data block from the unencrypted volume, determining that the second data block is unencrypted, and outputting the second data block to the unencrypted volume without performing any additional decryption on the second data block.

18. The non-transitory computer-readable media of claim 13, the operations further comprising:
   determining that all of the plurality of data blocks included in the snapshot have been encrypted; and
   setting the snapshot-level encryption status associated with the snapshot to a second value indicating that the snapshot is in an encrypted state.

19. The non-transitory computer-readable media of claim 18, the operations further comprising:
   determining that at least one parent snapshot associated with the snapshot is not in an encrypted state; and
   waiting until the at least one parent snapshot is in an encrypted state prior to setting the snapshot-level encryption status to the second value indicating that the snapshot is in an encrypted state.

20. The non-transitory computer-readable media of claim 13, wherein the block-level encryption status is indicated by a block encryption status flag stored as part of block metadata associated with the first data block.

\* \* \* \* \*